(12) United States Patent
Lee et al.

(10) Patent No.: US 12,297,355 B2
(45) Date of Patent: May 13, 2025

(54) HYBRID CROSSLINKED POLYMER MEMBRANE

(71) Applicant: SOGANG UNIVERSITY RESEARCH & BUSINESS DEVELOPMENT FOUNDATION, Seoul (KR)

(72) Inventors: Jong Suk Lee, Seoul (KR); Hyun Jung Yu, Gyeonggi-do (KR); Ju Ho Shin, Seoul (KR); Heseong An, Chungcheongbuk-do (KR)

(73) Assignee: SOGANG UNIVERSITY RESEARCH & BUSINESS DEVELOPMENT FOUNDATION (KR)

( * ) Notice: Subject to any disclaimer, the term of this patent is extended or adjusted under 35 U.S.C. 154(b) by 418 days.

(21) Appl. No.: 17/700,621

(22) Filed: Mar. 22, 2022

(65) Prior Publication Data
US 2022/0372289 A1    Nov. 24, 2022

(30) Foreign Application Priority Data
Apr. 28, 2021    (KR) .................. 10-2021-0054830

(51) Int. Cl.
*C08L 79/00*    (2006.01)
*B01D 53/22*    (2006.01)
(Continued)

(52) U.S. Cl.
CPC ............ *C08L 79/08* (2013.01); *B01D 53/228* (2013.01); *B01D 67/0006* (2013.01);
(Continued)

(58) Field of Classification Search
CPC ... C08L 79/08; C08L 2312/00; B01D 53/228; B01D 67/0006; B01D 67/0083;
(Continued)

(56) References Cited

U.S. PATENT DOCUMENTS

| 11,135,552 | B2 | 10/2021 | Lee et al. | |
| 2013/0014642 | A1* | 1/2013 | Sano | C08F 212/26 96/5 |
| 2018/0369761 | A1* | 12/2018 | Hessler | B01D 53/22 |

FOREIGN PATENT DOCUMENTS

| KR | 2015-0001369 A | 1/2015 |
| KR | 2016-0103810 A | 9/2016 |

(Continued)

OTHER PUBLICATIONS

Yu et al., "Tailoring selective pores of carbon molecular sieve membranes towards enhanced N2/CH4 separation efficiency" Journal of Membrane Science vol. 620, Feb. 15, 2021, available at https://www.sciencedirect.com/science/article/pii/S0376738820313892. (Year: 2021).*

(Continued)

*Primary Examiner* — T. Bennett McKenzie
(74) *Attorney, Agent, or Firm* — Harness, Dickey & Pierce, P.L.C.

(57) ABSTRACT

A hybrid crosslinked polymeric membrane and a process for fabricating the same are provided. Specifically, the hybrid crosslinked polymer membrane comprises a glassy polymer and a ladder-structured polysilsesquioxane and has a crosslinked structure. The hybrid crosslinked polymer membrane can have an excellent permeability of carbon dioxide by virtue of an increase in the free volume and enhanced plasticization resistance, chemical resistance, and durability.

10 Claims, 5 Drawing Sheets

(51) Int. Cl.
*B01D 67/00* (2006.01)
*B01D 71/64* (2006.01)
*B01D 71/70* (2006.01)
*C08G 73/10* (2006.01)
*C08G 77/26* (2006.01)
*C08J 5/18* (2006.01)
*C08L 79/08* (2006.01)

(52) U.S. Cl.
CPC ......... *B01D 67/0083* (2013.01); *B01D 71/64* (2013.01); *B01D 71/70* (2013.01); *C08G 73/1032* (2013.01); *C08G 73/1042* (2013.01); *C08G 73/1067* (2013.01); *C08G 77/26* (2013.01); *C08J 5/18* (2013.01); *B01D 2323/08* (2013.01); *B01D 2323/12* (2013.01); *B01D 2323/30* (2013.01); *C08J 2379/08* (2013.01); *C08J 2483/08* (2013.01); *C08L 2312/00* (2013.01)

(58) Field of Classification Search
CPC .... B01D 71/64; B01D 71/70; B01D 2232/08; B01D 2232/12; B01D 2232/30; C08G 73/1067; C08G 77/26; C08J 5/18; C08J 2379/08; C08J 2483/08

USPC .......................................................... 95/51
See application file for complete search history.

(56) References Cited

FOREIGN PATENT DOCUMENTS

| KR | 2017-0051156 A | | 5/2017 | |
|---|---|---|---|---|
| KR | 10-1833754 B1 | | 4/2018 | |
| KR | 2019-0070249 A | | 6/2019 | |
| KR | 20200064651 A | * | 6/2020 | .......... C08G 73/106 |
| KR | 2021-0128568 A | | 10/2021 | |
| WO | 2015-030594 A1 | | 3/2015 | |
| WO | 2015-153574 A1 | | 10/2015 | |

OTHER PUBLICATIONS

Lu Shao et al., "Comparison of Diamino Cross-Linking in Different Polymide Solutions and Membranes by Precipitation Observation and Gass Transport", Science Direct, Journal of Membrane Science 312, 2008, pp. 174-185.

Heseong An et al., "Bromination/Debromination-Induced Thermal Crosslinking of 6FDA-Durene for Aggressive Gas Separations", Journal of Membrane Science 545, 2018, pp. 358-366.

* cited by examiner

HYBRID CROSSLINKED POLYMER MEMBRANE

CROSS-REFERENCE TO RELATED APPLICATION

This application claims priority to Korean Patent Application No. 10-2021-0054830, filed on Apr. 28, 2021, and all the benefits accruing therefrom under 35 U.S.C. § 119, the contents of which in its entirety are herein incorporated by reference.

BACKGROUND

1. Technical Field

The present invention relates to a hybrid crosslinked polymer membrane and to a process for fabricating the same. Specifically, the present invention relates to a polymer membrane that comprises a glassy polymer and a ladder-structured polysilsesquioxane and has a crosslinked structure and to a process for preparing the same.

DESCRIPTION ABOUT NATIONAL SUPPORT RESEARCH AND DEVELOPMENT

This work was supported by C1 Gas Refinery Program through the National Research Foundation of Korea (NRF) funded by the ministry of Science and ICT (Project No. 2019M3D3A1A01069101) and Korea Institute of Energy Technology Evaluation and Planning (KETEP) grant funded by the Korea government (MOTIE) (20214000000500), Training program of CCUS for the green growth.

2. Description of the Related Art

In recent years, the demand for energy is rapidly increasing in tandem with the economic development of such developing countries as China, India, and the like. In particular, natural gas plays a major role as an energy source. However, since natural gas generally contains carbon dioxide to some extent, it is necessary to improve the quality of natural gas by lowering it to a certain content (e.g., 2% by mole). In addition, the concentration of impurities such as carbon dioxide, nitrogen, and C2-C4 hydrocarbons must be removed below a certain level for the transportation of natural gas. According to the U.S. Pipeline Specifications, the concentration of carbon dioxide and nitrogen is stipulated to be lowered to 2% by mole and 4% by mole, respectively.

In general, carbon dioxide is removed using cryogenic distillation in large-scale refining of natural gas, which is expensive and uneconomical for small-scale refining of natural gas. As a technology for removing carbon dioxide from natural gas in a small scale, a pressure swing adsorption (PSA) process capable of selectively adsorbing/removing carbon dioxide alone or a separation membrane technology that selectively passes carbon dioxide alone is attracting attention. In particular, if carbon dioxide is selectively passed through and methane is collected as a retentate, the recompression step is not required, whereby the process costs can be reduced.

Meanwhile, in order to separate carbon dioxide and methane, a process using a membrane is attracting attention. The membrane process is advantageous due to small footprints, relatively low energy consumption and costs. However, if a gas with high condensability such as $CO_2$ is present in the feed gas at a high pressure, the polymer membrane would be plasticized, thereby reducing its selectivity of gases. Crosslinked membranes have been developed to suppress the plasticization of polymer membranes. However, crosslinking of polyimide using an amine crosslinking agent has a problem in that the free volume decreases, which reduces the $CO_2$ permeability, and crosslinked membranes using bromination/debromination have poor process efficiency because polyimide has to undergo bromination and debromination (see J. Membr. Sci. 2008, 312, 174-185 and J. Membr. Sci. 2018, 545, 358-366).

SUMMARY

Technical Problem to be Solved

An object of the present invention is to provide a hybrid crosslinked polymer membrane having an excellent permeability of carbon dioxide ($CO_2$) and enhanced plasticization resistance, chemical resistance, and durability.

Another object of the present invention is to provide a process for preparing the hybrid crosslinked polymer membrane.

Another object of the present invention is to provide a process for separating a mixed gas using the hybrid crosslinked polymer membrane.

Solution to the Problem

According to an embodiment of the present invention to attain the object, there is provided a hybrid crosslinked polymer membrane, which is prepared from a polymer composition comprising 70 to 90% by weight of a glassy polymer having a first functional group and 10 to 30% by weight of a ladder-structured polysilsesquioxane having a second functional group capable of reacting with the first functional group and has a crosslinked structure formed by a reaction of the first functional group and the second functional group.

According to another embodiment of the present invention, there is provided a process for preparing a hybrid crosslinked polymer membrane, which comprises (1) dissolving a polymer composition comprising 70 to 90% by weight of a glassy polymer having a first functional group and 10 to 30% by weight of a ladder-structured polysilsesquioxane having a second functional group capable of reacting with the first functional group in an organic solvent; (2) forming the polymer solution obtained in step (1) into a membrane shape and removing the organic solvent therefrom to obtain a hybrid polymer precursor membrane; and (3) thermally treating the hybrid polymer precursor membrane obtained in step (2) to form a crosslinked structure.

According to another embodiment of the present invention, there is provided a process for separating gases, which comprises passing a mixed gas containing at least carbon dioxide through the hybrid crosslinked polymer membrane according to an embodiment of the present invention to remove at least a portion of the carbon dioxide.

Advantageous Effects of the Invention

The hybrid crosslinked polymer membrane according to the embodiment of the present invention can have an excellent permeability of carbon dioxide by virtue of an increase in the free volume.

In addition, the hybrid crosslinked polymer membrane according to the embodiment of the present invention can have enhanced plasticization resistance, chemical resistance, and durability by virtue of a crosslinked structure.

BRIEF DESCRIPTION OF THE DRAWINGS

FIGS. 5(a) and 5(b) show the separation performance of $CO_2/N_2$ and $CO_2/CH_4$ of the PI-2:1 crosslinked membrane, and FIGS. 5(c) and 5(d) show the separation performance of $CO_2/N_2$ and $CO_2/CH_4$ of the PI-4:1 and 6FDA-3:2-based crosslinked membrane.

DETAILED DESCRIPTION

Figure 1A:
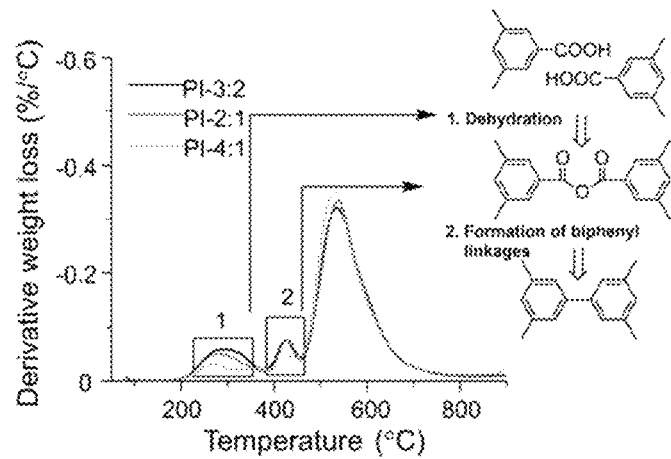
FIGS. 1(a)-1(d) show thermogravimetric analysis in FIG. 1(a) and O1s XPS spectra in FIG. 1(b) of a crosslinked polyimide membrane and thermogravimetric analysis in FIG. 1(c) and O1s XPS spectra in FIG. 1(d) of a hybrid crosslinked polymer membrane.
Figure 1B:
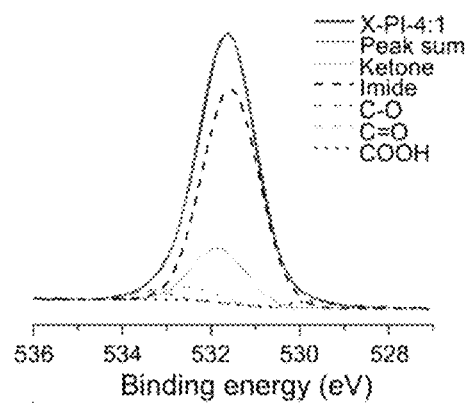
Figure 1C:
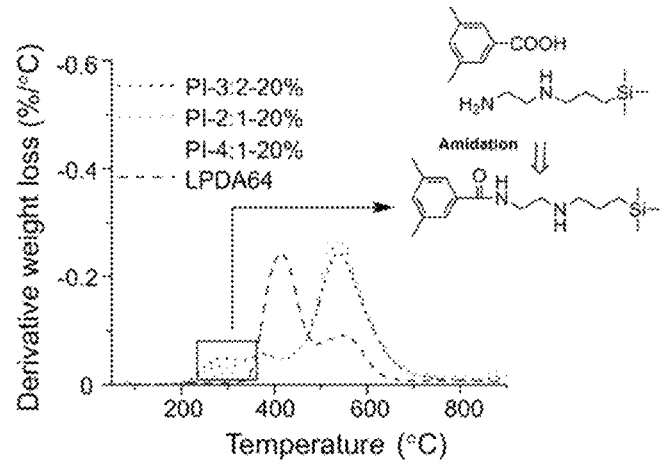
Figure 1D:
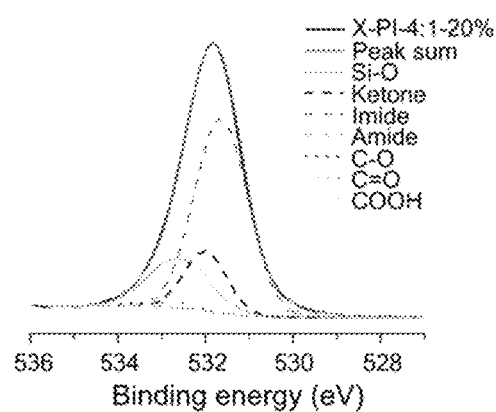
Figure 2A:
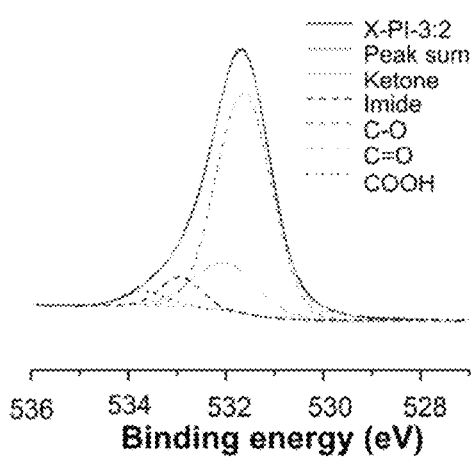
FIGS. 2(a)-2(f) show XPS spectra of X-PI-3:2 in FIG. 2(a), X-PI-3:2-20% in FIG. 2(b), X-PI-2:1 in FIG. 2(c), X-PI-2:1-20% in FIG. 2(d), X-PI-4:1 in FIG. 2(e), and X-PI-4:1-20% in FIG. 2(f).
Figure 2B:
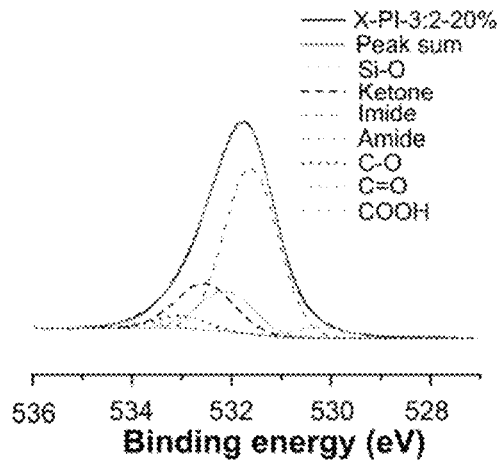
Figure 2C:
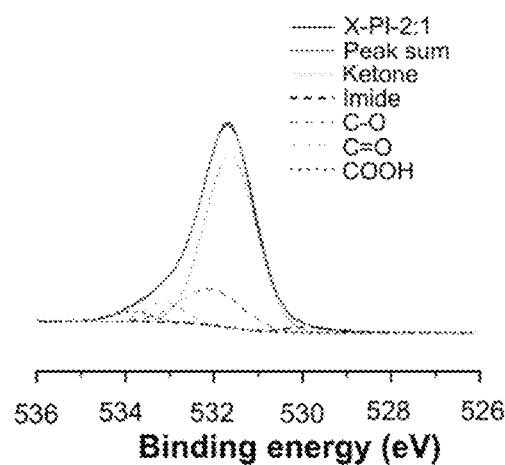
Figure 2D:
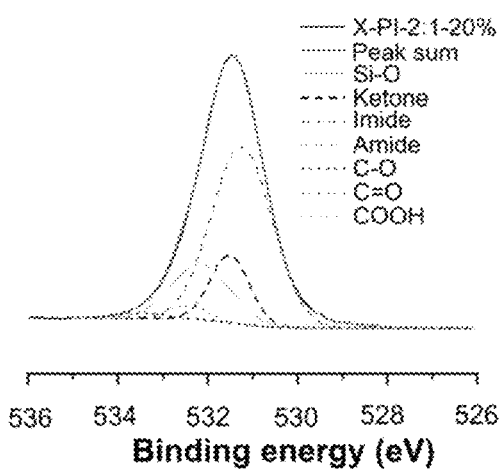
Figure 2E:
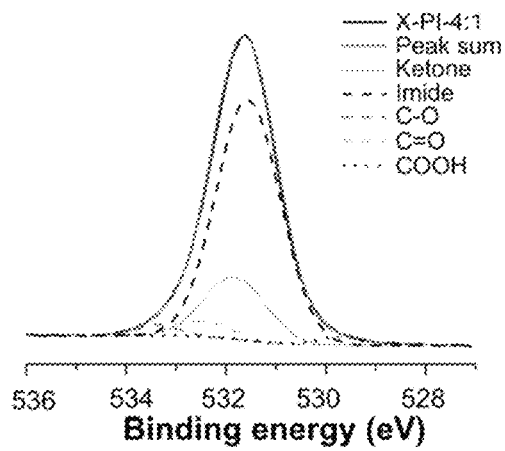
Figure 2F:
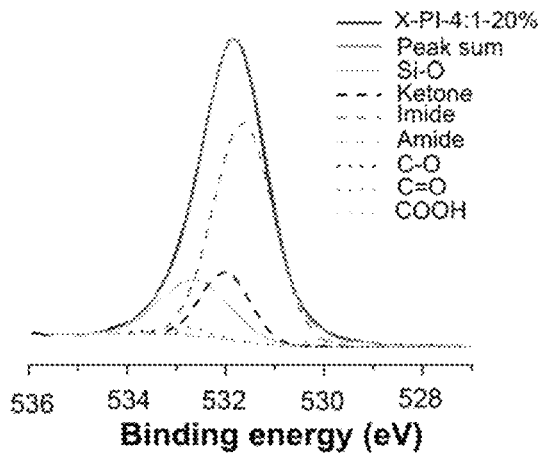

Hereinafter, the present invention will be described in more detail.

Hybrid Crosslinked Polymer Membrane

According to an embodiment of the present invention, there is provided a hybrid crosslinked polymer membrane, which is prepared from a polymer composition comprising 70 to 90% by weight of a glassy polymer having a first functional group and 10 to 30% by weight of a ladder-structured polysilsesquioxane having a second functional group capable of reacting with the first functional group and has a crosslinked structure formed by a reaction of the first functional group and the second functional group.

The hybrid crosslinked polymer membrane according to an embodiment of the present invention is prepared from a polymer composition comprising 70 to 90% by weight of a glassy polymer having a first functional group and 10 to 30% by weight of a ladder-structured polysilsesquioxane having a second functional group capable of reacting with the first functional group.

In a specific embodiment of the present invention, the glassy polymer comprising a first functional group may be a polyimide.

Specifically, the polyimide may be obtained by a known polycondensation of an aromatic carboxylic dianhydride and an aromatic diamine. Thus, the polyimide may be a polyimide obtained by polycondensation of an aromatic carboxylic dianhydride and an aromatic diamine.

In a specific embodiment of the present invention, the aromatic carboxylic dianhydride that may be used in the synthesis of the polyimide may be at least one selected from the group consisting of benzophenone-3,3',4,4'-tetracarboxylic dianhydride (BTDA) having a structure of Formula 1(a) below, 4'4-oxydiphthalic dianhydride (ODPA) having a structure of Formula 1(b) below, 3,3'4,4'-biphenyltetracarboxylic dianhydride (BPDA) having a structure of Formula 1(c) below, and 4,4'-(hexafluoroisopropylidene)diphthalic dianhydride (6FDA) having a structure of Formula 1(d) below. But the aromatic carboxylic dianhydride is not particularly limited thereto. Preferably, the aromatic carboxylic dianhydride may be benzophenone-3,3',4,4'-tetracarboxylic dianhydride (BTDA).

Formula 1

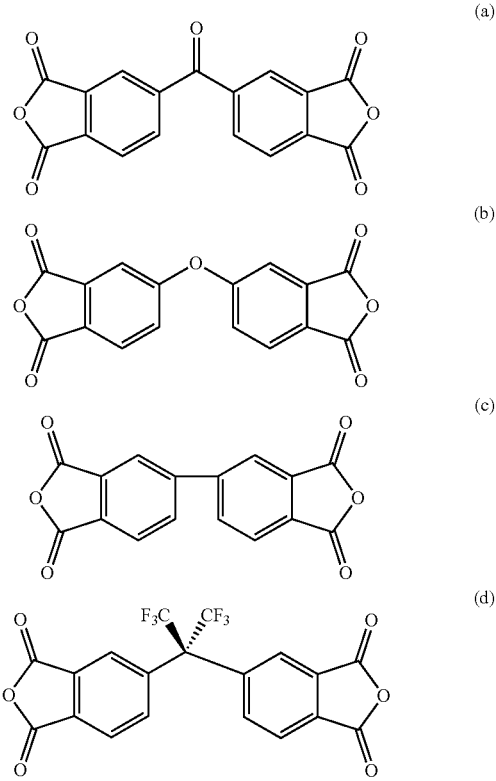

In a specific embodiment of the present invention, the aromatic diamine that may be used in the synthesis of the polyimide may be at least one selected from the group consisting of 2,3,5,6-tetramethylene-1,4-phenylenediamine (Durene) having a structure of Formula 2(a) below, 3,5-diaminobenzoic acid (DABA) having a structure of Formula 2(b) below, 1,1-bis(4-aminophenyl)cyclohexane (BACH) having a structure of Formula 2(c) below, and 2,4,6-trimethyl-1,3-diaminobenzene (DAM) having a structure of Formula 2(d) below. But the aromatic diamine is not particularly limited thereto. Preferably, the aromatic diamine may be a mixture of 2,3,5,6-tetramethylene-1,4-phenylenediamine (Durene) and 3,5-diaminobenzoic acid (DABA).

Formula 2

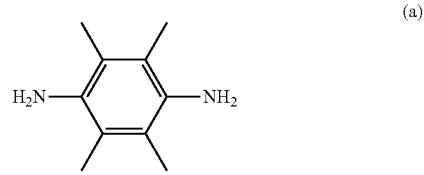

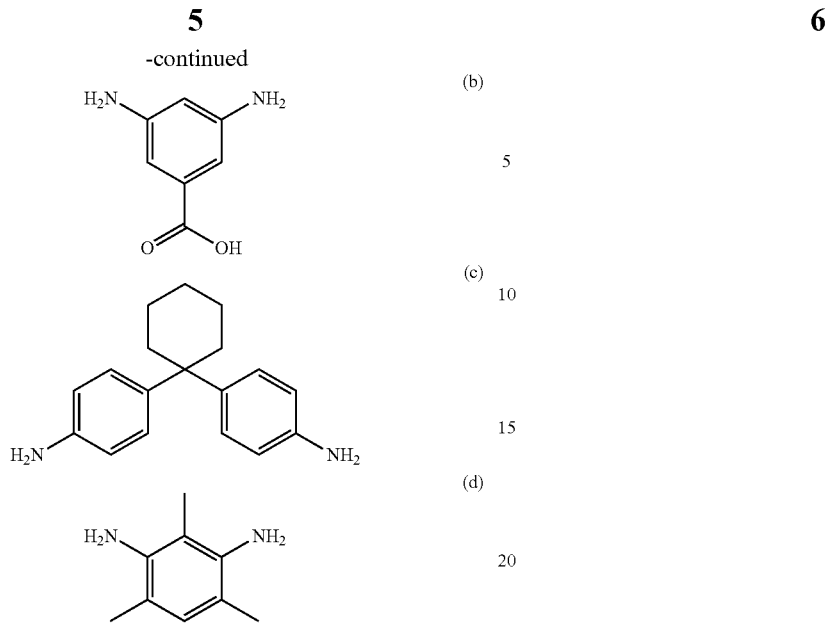

In a preferred example, the polyimide according to an embodiment of the present invention may be a polyimide (BTDA-Durene:DABA(3:2)) having a structure of Formula 3 below.

Formula 3

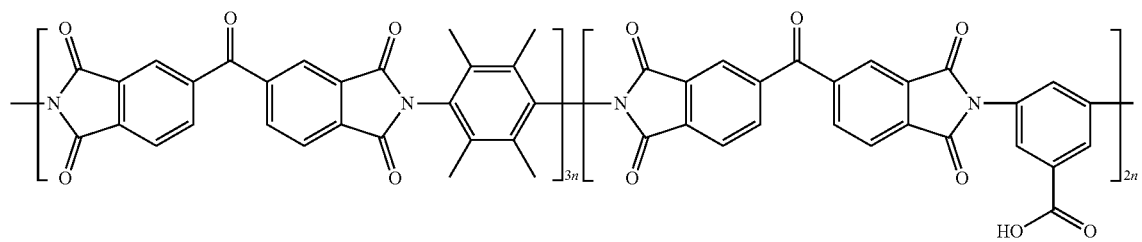

In Formula 3, n is an integer selected from $10^2$ to $10^4$.

In the hybrid crosslinked polymer membrane according to an embodiment of the present invention, the glassy polymer has a first functional group. Here, the first functional group is not particularly limited as long as it can react with a second functional group to be described below.

In a specific embodiment of the present invention, the first functional group may be at least one selected from the group consisting of an amine group and a carboxyl group. Preferably, the first functional group may be a carboxyl group.

In a specific embodiment of the present invention, the ladder-structured polysilsesquioxane having a second functional group capable of reacting with the first functional group may have a structure represented by Formula 4 below.

Formula 4

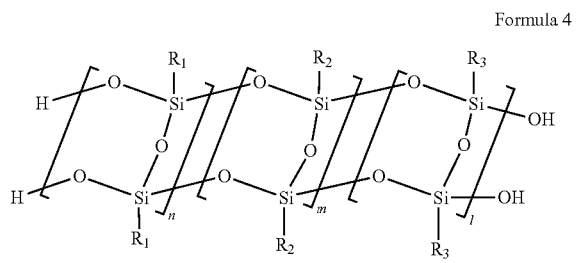

In Formula 4, $R_1$, $R_2$, and $R_3$ are each independently an organic functional group selected from the group consisting of aromatic phenyl, heteroaromatic phenyl, aliphatic alkyl, cycloaliphatic alkyl, vinyl, aryl, methacrylate, acrylate, and epoxy, at least one of which has a second function group, and n, m, and l are each an integer selected from 0 to 100.

The molar ratio of $R_1:R_3$ (i.e., n:l) may be 0.1:99.9 to 99.9:0.1, as expressed in terms of the copolymerization ratio of the organic functional groups in the ladder-structured polysilsesquioxane, and m may be 0. In addition, the molar ratio of $R_2:R_3$ (i.e., m:l) may be 0.1:99.9 to 99.9:0.1, and n may be 0.

Specifically, the molar ratio of $R_1:R_3$ may be 10:90 to 90:10, 20:80 to 80:20, 30:70 to 70:30, 50:50 to 70:30, or 55:45 to 65:35. More specifically, the molar ratio of $R_1:R_3$ may be about 6:4. Here, m may be 0. In addition, the molar ratio of $R_2:R_3$ may be 10:90 to 90:10, 20:80 to 80:20, 30:70 to 70:30, 50:50 to 70:30, or 55:45 to 65:35. More specifically, the molar ratio of $R_2:R_3$ may be about 6:4. Here, n may be 0.

In addition, the molar ratio of $R_1:R_2:R_3$ (i.e., n:m:l) may preferably be about 3:3:4, 3:4:3, or 4:3:3, but it is not limited thereto.

The polysilsesquioxane may have a number average molecular weight of $10^2$ to $10^8$ g/mole, more specifically $10^3$ to $10^7$ or $10^4$ to $10^6$ g/mole.

In a specific embodiment of the present invention, the ladder-structured polysilsesquioxane may be selected from the group consisting of ladder-structured poly(phenyl-co-3-(2-aminoethylamino)propyl)silsesquioxane, ladder-structured poly(phenyl-co-methacryloxypropyl)silsesquioxane, ladder-structured poly(phenyl-co-glycidoxypropyl)silsesquioxane, ladder-structured poly(phenyl-co-pyridylethyl)silsesquioxane, ladder-structured poly(cyclohexyl-co-pyridylethyl)silsesquioxane, ladder-structured poly(cyclohexyl-co-phenyl-co-pyridylethyl)silsesquioxane, and a mixture thereof. But the ladder-structured polysilsesquioxane is not particularly limited thereto.

Preferably, the ladder-structured polysilsesquioxane may be at least one selected from the group consisting of ladder-structured poly(phenyl-co-3-(2-aminoethylamino)propyl)silsesquioxane (LPDA64) represented by the following Formula 4a in which $R_1$ and $R_3$ have a molar ratio of 6:4 in Formula 4; ladder-structured poly(phenyl-co-methacryloxypropyl)silsesquioxane (LPMA64) represented by the following Formula 4b wherein $R_1$ and $R_3$ have a molar ratio of 6:4 in Formula 4, ladder-structured poly(phenyl-co-glycidoxypropyl)silsesquioxane (LPG64) represented by the following Formula 4c wherein $R_1$ and $R_3$ have a molar ratio of 6:4 in Formula 4, ladder-structured poly(phenyl-co-pyridylethyl)silsesquioxane (LPPyr64) represented by the following Formula 4d wherein $R_1$ and $R_3$ have a molar ratio of 6:4 in Formula 4, ladder-structured poly(cyclohexyl-co-pyridylethyl)silsesquioxane (LCPyr64) represented by the following Formula 4e wherein $R_1$ and $R_3$ have a molar ratio of 6:4 in Formula 4, and ladder-structured poly(cyclohexyl-co-phenyl-co-pyridylethyl)silsesquioxane (LCPPyr334) represented by the following Formula 4f wherein $R_1$, $R_2$, and $R_3$ have a molar ratio of 3:3:4 in Formula 4.

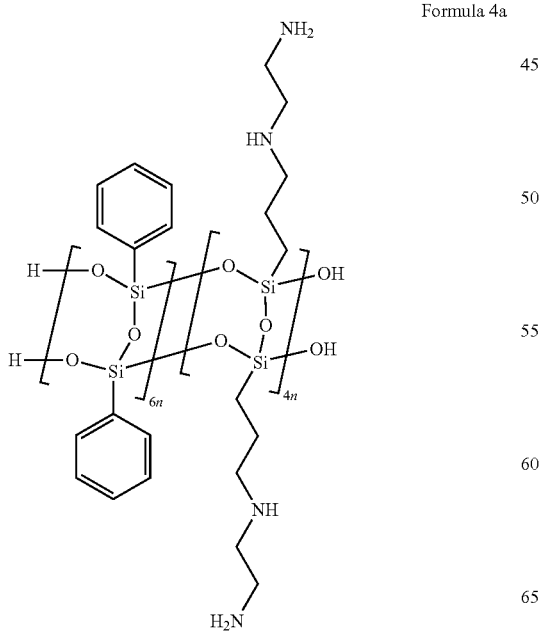

Formula 4a

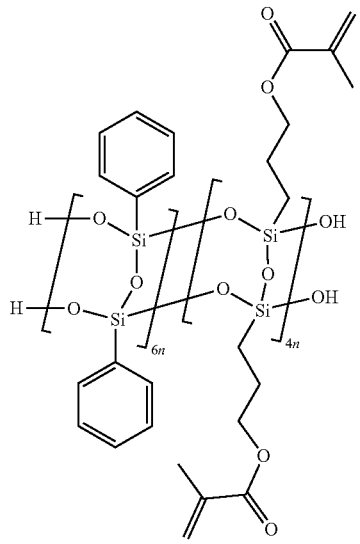

Formula 4b

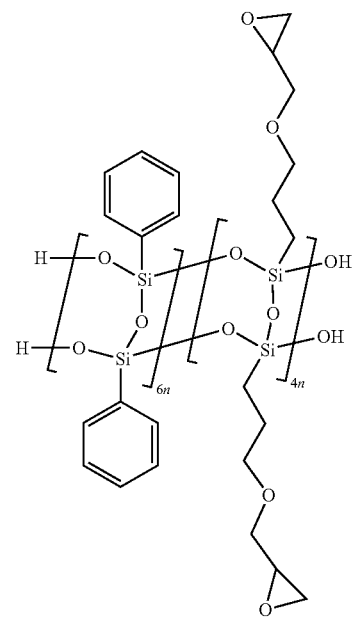

Formula 4c

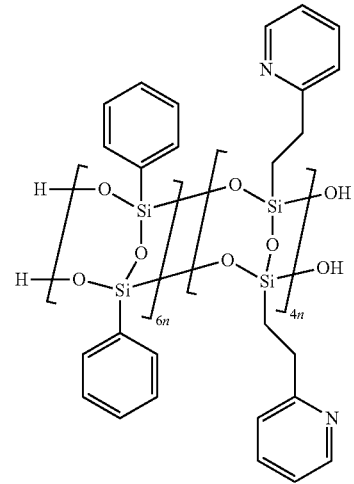

Formula 4d

Formula 4e

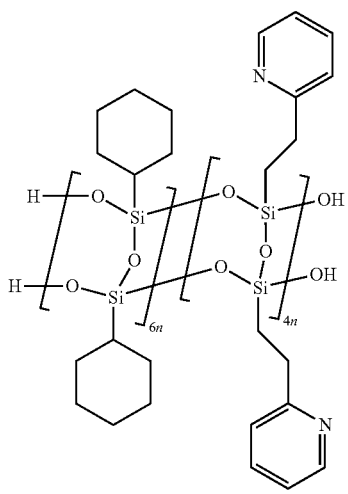

Formula 4f

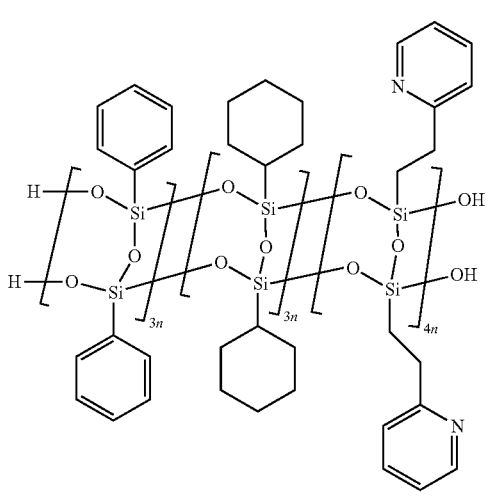

The ladder-structured polysilsesquioxane may be obtained by a known hydrolysis-condensation reaction of a silane monomer. Specifically, the ladder-structured polysilsesquioxane may be obtained by a known hydrolysis-condensation reaction of at least one selected from the group consisting of (a) an aliphatic monomer, (b) an aromatic monomer, and (c) a crosslinkable monomer.

In a specific embodiment of the present invention, the silane monomer may be at least one selected from the group consisting of [3-(2-aminoethylamino)propyl]trimethoxysilane, (3-bromopropyl)trimethoxysilane, (acetoxy)methyltrimethoxysilane, (phenyl)trimethoxysilane, ((chloromethyl)phenylethyl)trimethoxysilane, 2-(2-pyridylethyl)trimethoxysilane, (3-glycidoxypropyl)trimethoxysilane, (methacryloxypropyl)trimethoxysilane, and (butenyl)trimethoxysilane. But the silane monomer that can be used in the synthesis of the ladder-structured polysilsesquioxane is not particularly limited thereto.

Preferably, the aliphatic silane monomer that can be used in the synthesis of the ladder-structured polysilsesquioxane may comprise at least one of [3-(2-aminoethylamino)propyl]trimethoxysilane, (3-bromopropyl)trimethoxysilane, and (acetoxy)methyltrimethoxysilane as represented by the following Formula 5(a); the aromatic silane monomer may comprise at least one of (phenyl)trimethoxysilane, ((chloromethyl)phenylethyl)trimethoxysilane, and 2-(2-pyridylethyl)trimethoxysilane as represented by the following Formula 5(b); and the crosslinkable silane monomer may comprise at least one of (3-glycidoxypropyl)trimethoxysilane, (methacryloxypropyl)trimethoxysilane, and (butenyl)trimethoxysilane as represented by the following Formula 5(c).

Formula 5

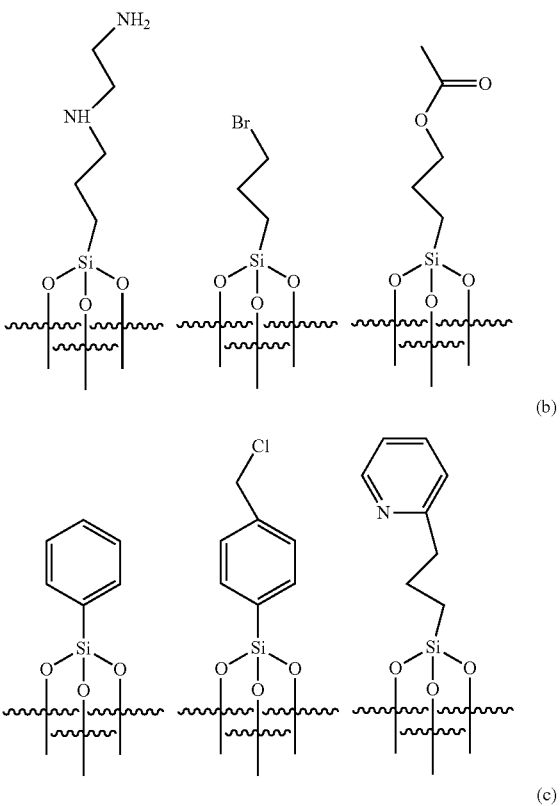

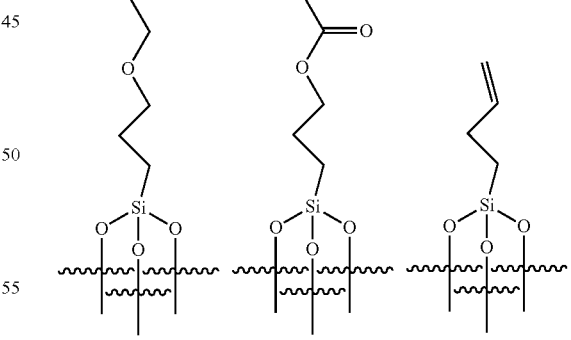

In the hybrid crosslinked polymer membrane according to an embodiment of the present invention, the ladder-structured polysilsesquioxane has a second functional group capable of reacting with the first functional group. Here, the second functional group is not particularly limited as long as it can react with the first functional group described above.

In a specific embodiment of the present invention, the second functional group may be at least one selected from the group consisting of an amine group and an epoxy group. Preferably, the second functional group may be an amine group.

In a specific embodiment of the present invention, the first functional group may be a carboxyl group and the second functional group may be an amine group, or the first functional group may be an amine group and the second functional group may be an epoxy group.

The polymer composition for preparing the hybrid crosslinked polymer membrane according to an embodiment of the present invention comprises 70 to 90% by weight of a glassy polymer having a first functional group and 10 to 30% by weight of a ladder-structured polysilsesquioxane having a second functional group capable of reacting with the first functional group. Preferably, the polymer composition for preparing the hybrid crosslinked polymer membrane according to an embodiment of the present invention comprises 75 to 85% by weight of a glassy polymer having a first functional group and 15 to 25% by weight of a ladder-structured polysilsesquioxane having a second functional group capable of reacting with the first functional group. More preferably, the polymer composition for preparing the hybrid crosslinked polymer membrane according to an embodiment of the present invention comprises 78 to 85% by weight of a glassy polymer having a first functional group and 15 to 22% by weight of a ladder-structured polysilsesquioxane having a second functional group capable of reacting with the first functional group. If the content ratio of the glassy polymer having a first functional group and the ladder-structured polysilsesquioxane having a second functional group capable of reacting with the first functional group in the polymer composition for preparing the hybrid crosslinked polymer membrane according to an embodiment of the present invention satisfies the above range, the hybrid crosslinked polymer membrane according to an embodiment of the present invention prepared therefrom has an excellent permeability of carbon dioxide.

In the hybrid crosslinked polymer membrane according to an embodiment of the present invention, 70 to 100% of each of the first functional group and the second functional group may participate in the crosslinking reaction.

The hybrid crosslinked polymer membrane according to an embodiment of the present invention has a crosslinked structure formed by reacting the first functional group and the second functional group.

In a specific embodiment of the present invention, the first functional group may be a carboxyl group, and the second functional group may be an amine group, so that the carboxyl group and the amine group are amidated to form a crosslinked structure in the hybrid crosslinked polymer membrane according to an embodiment of the present invention.

As the hybrid crosslinked polymer membrane according to an embodiment of the present invention has a crosslinked structure, it may be enhanced in plasticization resistance, chemical resistance, and durability.

In general, a polymer membrane does not contain micropores in the selective layer. But the thermal fluctuation of the polymer chains creates empty spaces, i.e., free volume, between the chains, through which a gas permeates. Conventional polymer membranes, however, involve the aging phenomenon that decreases the permeability over time and the plasticization phenomenon that reduces the selectivity to condensable gases under high pressures.

On the other hand, in the hybrid crosslinked polymer membrane according to an embodiment of the present invention, the rigid double siloxane structure of the ladder-structured polysilsesquioxane added to the glassy polymer (specifically, polyimide) matrix that has a high free volume retards the movement of the polymer chains, thereby reducing the aging phenomenon (i.e., antiaging effect) and reducing the plasticization phenomenon (i.e., antiplasticization effect).

In a specific embodiment of the present invention, the hybrid crosslinked polymer membrane may be a dense film. In such an event, the hybrid crosslinked polymer membrane may have a thickness of 5 to 100 μm, preferably, a thickness of 10 to 90 μm, 20 to 80 μm, or 30 to 80 μm.

Alternatively, the hybrid crosslinked polymer membrane may be a hollow fiber membrane. Here, the hollow fiber membrane may be fabricated by, for example, a dry-jet/wet-quench process as disclosed in U.S. Pat. No. 11,135,552, the disclosure of which is incorporated herein by reference.

The hybrid crosslinked polymer membrane according to an embodiment of the present invention may have an outer diameter of 200 to 400 μm and an inner diameter of 100 to 200 μm. Preferably, the hybrid crosslinked polymer membrane may have an outer diameter of 250 to 350 μm and an inner diameter of 120 to 180 μm.

Accordingly, the hybrid crosslinked polymer membrane according to an embodiment of the present invention can be advantageously used to separate carbon dioxide from a mixed gas.

Process for Preparing a Hybrid Crosslinked Polymer Membrane

According to another embodiment of the present invention, there is provided a process for preparing a hybrid crosslinked polymer membrane, which comprises (1) dissolving a polymer composition comprising 70 to 90% by weight of a glassy polymer having a first functional group and 10 to 30% by weight of a ladder-structured polysilsesquioxane having a second functional group capable of reacting with the first functional group in an organic solvent; (2) forming the polymer solution obtained in step (1) into a membrane shape and removing the organic solvent therefrom to obtain a hybrid polymer precursor membrane; and (3) thermally treating the hybrid polymer precursor membrane obtained in step (2) to form a crosslinked structure.

Step (1)

In step (1), a polymer composition comprising 70 to 90% by weight of a glassy polymer having a first functional group and 10 to 30% by weight of a ladder-structured polysilsesquioxane having a second functional group capable of reacting with the first functional group is dissolved in an organic solvent.

In such an event, the content ratio of the glassy polymer having a first functional group and the ladder-structured polysilsesquioxane having a second functional group capable of reacting with the first functional group is substantially the same as those described in the section of the hybrid crosslinked polymer membrane above.

The organic solvent is not particularly limited as long as it dissolves the glassy polymer and the ladder-structured polysilsesquioxane and then is removed. Preferably, the organic solvent may be selected from the group consisting of N-methyl-2-pyrrolidone (NMP), dimethylformamide (DMF), tetrahydrofuran (THF), methylene chloride (MC), dimethyl sulfoxide (DMSO), and a mixture thereof.

The sequence of dissolving the glassy polymer and the ladder-structured polysilsesquioxane in an organic solvent is not particularly limited. Thus, the glassy polymer and the ladder-structured polysilsesquioxane may be mixed and then dissolved in an organic solvent. Alternatively, any one of the glassy polymer and the ladder-structured polysilsesquioxane may be first dissolved in an organic solvent and then the other one may be dissolved in the organic solvent.

The weight ratio of the organic solvent to the total weight of the glassy polymer and the ladder-structured polysilsesquioxane may be 0.1:99.9 to 40:60. Specifically, the weight of the solid contents of the glassy polymer and the ladder-structured polysilsesquioxane may be at least 0.1% by weight, at least 1% by weight, at least 5% by weight, at least 10% by weight, at least 15% by weight, at least 20% by weight, at least 25% by weight, at least 30% by weight, at least 35% by weight, or 40% by weight, and at most 40% by weight, at most 35% by weight, at most 30% by weight, at most 25% by weight, at most 20% by weight, at most 15% by weight, at most 10% by weight, at most 5% by weight, at most 1% by weight, or 0.1% by weight, based on the total weight of the glassy polymer, the ladder-structured polysilsesquioxane, and the organic solvent. More specifically, the weight of the solid contents of the glassy polymer and the ladder-structured polysilsesquioxane may be 0.1 to 40% by weight, 1 to 30% by weight, 5 to 20% by weight, or 7 to 13% by weight, based on the total weight of the glassy polymer, the ladder-structured polysilsesquioxane, and the organic solvent. If the total weight of the glassy polymer and the ladder-structured polysilsesquioxane is greater than 40% by weight of the glassy polymer, the ladder-structured polysilsesquioxane, and the organic solvent, it is difficult to form a hybrid polymer precursor membrane. If it is less than 0.1% by weight, the gas separation performance may be impaired.

Step (2)

In step (2), the polymer solution obtained in step (1) is formed into a membrane shape, for example, a film, and the organic solvent is then removed therefrom to obtain a hybrid polymer precursor membrane.

The method for forming a film from the polymer solution is not particularly limited. As a specific example, the polymer solution obtained in step (1) may be used to prepare a film on a glass plate using a solution casting technique with a doctor blade. In such an event, preferably, in order to facilitate evaporation of the solvent, the solution casting is carried out in a vacuum oven set at 60° C., and the molded film is left in the vacuum oven for about 12 hours.

Thereafter, the method for removing the residual solvent from the molded film is not particularly limited. As a specific example, preferably, the vitrified film is dried under vacuum at 180° C. for 12 hours.

Step (3)

In step (3), the hybrid polymer precursor membrane obtained in step (2) is thermally treated to form a crosslinked structure.

The conditions for the thermal treatment in step (3) are not particularly limited as long as the first functional group and the second functional group in the hybrid polymer precursor membrane can react to form a crosslinked structure.

In a specific embodiment of the present invention, the thermal treatment may be carried out at a temperature of 300 to 400° C. Specifically, the thermal treatment temperature may be higher than 300° C. to lower than 400° C. More specifically, the thermal treatment temperature may be 320° C. to 380° C., and it may be carried out under isothermal conditions. If the thermal treatment temperature exceeds 400° C., the polymer is carbonized. If it exceeds 500° C., steep mass variations may take place. Meanwhile, if the thermal treatment temperature is lower than 300° C., crosslinking may not take place sufficiently.

In a specific embodiment of the present invention, the thermal treatment may be carried out for 0.5 to 4 hours. Specifically, the thermal treatment time may be 0.5 to 3 hours, more specifically, 1 to 2 hours. If it is less than the above range, crosslinking may not take place sufficiently.

In a specific embodiment of the present invention, the thermal treatment may be carried out in an inert gas atmosphere. More specifically, the thermal treatment may be carried out in an argon gas atmosphere.

Gas Separation Method

According to another embodiment of the present invention, there is provided a process for separating gases, which comprises passing a mixed gas containing at least carbon dioxide through the hybrid crosslinked polymer membrane according to an embodiment of the present invention to remove at least a portion of the carbon dioxide.

In a specific embodiment of the present invention, the method may comprise separating at least one gas from a mixture of two or more gases. For example, the method may comprise separating carbon dioxide from a mixed gas comprising a combination selected from carbon dioxide/nitrogen, carbon dioxide/carbon tetrachloride, carbon dioxide/methane, and the like. But it is not limited particularly thereto.

Example

Hereinafter, the present invention will be described in more detail with reference to Examples and Comparative Examples. However, the following examples are for illustrative purposes only and are not intended to limit the scope of the present invention.

Preparation Example 1: Preparation of a Polyimide

Preparation Example 1-1

88 ml of N-methyl-2-pyrrolidone (NMP) was added to 6.54 g of benzophenone-3,3',4,4'-tetracarboxylic dianhydride (BTDA) and 3.24 g of a mixture of 2,3,5,6-tetramethyl-1,4-phenylenediamine (Durene)/3,5-diaminobenzoic acid (DABA) (molar ratio 3:2) to prepare a monomer solution of 10% by weight. The solution was stirred at about 5° C. for 24 hours to obtain a high-molecular weight polyamic acid solution. 1.95 g of β-picoline and 19.5 g of acetic anhydride were added to the polyamic acid solution, which was stirred at room temperature for 24 hours for imidization. The precipitated polyimide (BTDA-Durene:DABA(3:2)) was washed with methanol and dried at 180° C. under vacuum for 24 hours to obtain 8.90 g (yield: 91%) of BTDA-Durene:DABA(3:2) (hereinafter abbreviated as "PI-3:2").

Preparation Example 1-2

The same procedures as in Preparation Example 1-1 were carried out, except that 11.8 g of BTDA, 5.85 g of a mixture of Durene/DABA (molar ratio 2:1), 158 ml of NMP, 3.51 g of β-picoline, and 45.1 g of acetic anhydride were used, to obtain 15.53 g (yield 88%) of BTDA-Durene:DABA(2:1) ("PI-2:1").

Preparation Example 1-3

The same procedures as in Preparation Example 1-1 were carried out, except that 1.23 g of BTDA, 0.62 g of a mixture of Durene/DABA (molar ratio 4:1), 16.6 ml of NMP, 0.37 g of β-picoline, and 3.65 g of acetic anhydride were used, to obtain 1.65 g (yield 89%) of BTDA-Durene:DABA(4:1) ("PI-4:1").

Preparation Example 1-4

104 ml of NMP was added to 20 g of 4,4'-(hexafluoroisopropylidene)diphthalic anhydride (6FDA) and 4.06 g of a mixture of 2,4,6-trimethyl-1,3-diaminobenzene (DAM)/3,5-diaminobenzoic acid (DABA) (molar ratio 3:2) to prepare a monomer solution of 20% by weight. The solution was stirred at about 5° C. for 24 hours to obtain a high-molecular weight polyamic acid solution. 4.3 g of β-picoline and 43.2 g of acetic anhydride were added to the polyamic acid solution, which was stirred at room temperature for 24 hours for imidization. The precipitated polyimide (6FDA-DAM:DABA(3:2)) was washed with methanol and dried at 180° C. under vacuum for 24 hours to obtain 24.1 g (yield 100%) of 6FDA-DAM:DABA(3:2).

Preparation Example 2: Preparation of a Polysilsesquioxane

A 100-ml round bottom flask was charged with 0.04 g of potassium carbonate, 4.8 g of deionized water, and 8 g of tetrahydrofuran (THF) to obtain a clear solution. 9.52 g of phenyltrimethoxysilane and 10.68 g of [3-(2-aminoethylamino)propyl]trimethoxysilane were added dropwise thereto under nitrogen. The reaction mixture was vigorously stirred for 5 days. After evaporation of the volatile materials, the white resinous portion was dissolved in 100 ml of dichloromethane and extracted several times with water. The organic material was collected, dried over anhydrous magnesium sulfate, and filtered. Dichloromethane was evaporated to obtain 16.2 g of a white powder of poly(phenyl-co-3-(2-aminoethylamino)propyl)silsesquioxane (LPDA64) (yield: 80%).

Preparation Example 3: Preparation of a Polymer Precursor Membrane

Preparation Example 3-1 to 3-3

A polymer precursor membrane was prepared using each of the polyimides obtained in Preparation Example 1. Specifically, 0.45 g of each polyimide was completely dissolved in 2.55 g of NMP. A film was formed by a solution casting technique on a glass plate using a doctor blade. In such an event, in order to facilitate evaporation of the solvent, the solution casting was carried out in a vacuum oven set at 60° C., and the molded film was left in the vacuum oven for about 12 hours. Thereafter, the vitrified film was dried at 180° C. under vacuum for 12 hours to remove the residual solvent. The obtained polymer precursor membrane film had a uniform thickness of 30±3 μm.

Preparation Example 3-4 to 3-6

Each polyimide obtained in Preparation Example 1 and the polysilsesquioxane obtained in Preparation Example 2 were mixed at a weight ratio of 80:20 to form a polymer composition (hereinafter abbreviated as "PI-3:2-20%," "PI-2:1-20%," and "PI-4:1-20%," respectively). Then, a hybrid polymer precursor membrane was prepared in the same manner as in Preparation Example 3-1 above.

Preparation Example 3-7

For comparison, the PI-2:1 polyimide of Preparation Example 1-2 and a cage-structured octa(aminophenyl)silsesquioxane (OAPS) were mixed at a weight ratio of 80:20 to form a polymer composition (hereinafter abbreviated as "PI-2:1-OAPS20%"). Then, a hybrid polymer precursor membrane was prepared in the same manner as in Preparation Example 3-1 above.

Preparation Example 4: Preparation of a Crosslinked Polymer Membrane by Thermal Treatment The polymer precursor membranes obtained in Preparation Example 3 were each placed on the quartz plate (United Silica Products, USA) in the quartz tube (MTI, USA) of a thermal treatment apparatus, and both ends of the quartz tube were sealed with metal flanges having a silicon O-ring. To control the inside temperature of the quartz tube in the thermal treatment apparatus accurately and uniformly, a three-zone furnace (Thermcraft, USA) was used. Thermal treatment was carried out while argon was continuously fed into the quartz tube at a rate of 400 cm$^3$/minute. In such an event, the temperature and the temperature elevation rate were as shown in Table 1 below. Hereinafter, for a crosslinked polymer membrane, "X" was added to the above abbreviation.

TABLE 1

| Initial temp. (° C.) | Final temp. (° C.) | Temp. elevation rate (° C./min) |
|---|---|---|
| 50 | 320 | 10 |
| 320 | 370 | 1 |
| 370 | 370 | Maintained for 1 hour |

Test Example 1: Mass Variations of a Polymer Precursor Membrane with Respect to Temperature The polymer precursor membrane of Preparation Example 3-3 and the hybrid polymer precursor membrane of Preparation Example 3-6 were thermally treated in the range of 200 to 370° C., during which the mass variations were observed. As a result of analyzing the XPS O1s spectra of the polymer membrane thermally treated at 370° C. for 1 hour, C═O bonds and C—O bonds of an anhydride formed by the dehydration of carboxyl groups were observed. Meanwhile, a peak for an amide bond was observed in the hybrid membrane (see FIGS. 1(a)-1(d)). It is understood that an amidation reaction took place between the amine group of LPDA64 and the carboxyl group of BTDA-Durene:DABA(4:1) to form a crosslinked structure.

In addition, the ratio of carboxyl groups that had formed the amide or anhydride bonds to the total number of carboxyl groups in the crosslinked polyimide membrane and the hybrid crosslinked polymer membrane was calculated using the XPS N1s spectra and O1s spectra (FIGS. 2(a)-2(f), Table 2). As the ratio of Durene in the monomer increased, the ratio of carboxyl groups converted to anhydrides or amides upon crosslinking decreased.

TABLE 2

|  | Carboxyl groups converted to anhydride/total carboxyl groups (%) | Carboxyl groups converted to amide/total carboxyl groups (%) | Carboxyl groups converted to anhydride or amide/total carboxyl groups (%) |
|---|---|---|---|
| X-PI-3:2 | 83.1 | 0 | 83.1 |
| X-PI-3:2-20% | 68.9 | 31.1 | 95.6 |
| X-PI-2:1 | 81.6 | 0 | 81.6 |
| X-PI-2:1-20% | 63.6 | 31.6 | 95.1 |
| X-PI-4:1 | 76.2 | 0 | 76.2 |
| X-PI-4:1-20% | 40.6 | 40.2 | 80.8 |

Test Example 2: Gas Separation Performance of a Polymer Precursor Membrane and a Crosslinked Polymer Membrane The gas separation performance of the polymer precursor membrane obtained in Preparation Example 3 and the crosslinked polymer membrane obtained in Preparation Example 4 was measured under the conditions of 1 atm and 35° C. The results are shown in Tables 3 to 5 below.

TABLE 3

|  | Gas permeability (Barrer) | | | | | Selectivity (—) | |
|---|---|---|---|---|---|---|---|
|  | $H_2$ | $CO_2$ | $N_2$ | $CO$ | $CH_4$ | $CO_2/N_2$ | $CO_2/CH_4$ |
| PI-3:2 | 10 | 5.2 | 0.14 | 0.30 | 0.15 | 37 | 35 |
| PI-2:1 | 18 | 5.5 | 0.19 | 0.33 | 0.13 | 29 | 42 |
| PI-4:1 | 20 | 8.1 | 0.27 | 0.48 | 0.23 | 30 | 35 |
| X-PI-3:2 | 43 | 16 | 0.55 | 0.99 | 0.37 | 29 | 43 |
| X-PI-2:1 | 52 | 25 | 0.87 | 1.5 | 0.64 | 29 | 39 |
| X-PI-4:1 | 89 | 51 | 1.9 | 3.3 | 1.6 | 27 | 32 |

As can be seen from Table 3, as the ratio of Durene in the diamine constituting the polymer increased, the free volume increased, which increased the gas permeability. In the polyimide crosslinked membranes, the $CO_2$ permeability increased by 207 to 530% as compared with the polyimide precursor membranes. The X-PI-4:1 crosslinked membrane having a high ratio of Durene in the diamine had the highest gas permeability like the precursor membranes. The $CO_2/N_2$ and $CO_2/CH_4$ selectivities of the X-PI-4:1 polyimide crosslinked membrane were reduced by 10% and 8.6%, respectively, as compared with the polyimide precursor membrane counterpart (PI-4:1).

TABLE 4

|  | Gas permeability (Barrer) | | | | | Selectivity (—) | |
|---|---|---|---|---|---|---|---|
|  | $H_2$ | $CO_2$ | $N_2$ | $CO$ | $CH_4$ | $CO_2/N_2$ | $CO_2/CH_4$ |
| X-PI-3:2 | 43 | 16 | 0.55 | 0.99 | 0.37 | 29 | 43 |
| X-PI-3:2-10% | 52 | 29 | 1.19 | 1.9 | 0.85 | 25 | 34 |
| X-PI-3:2-20% | 69 | 50 | 1.8 | 3.3 | 1.8 | 28 | 28 |

As can be seen from Table 4, as the content of the ladder-structured polysilsesquioxane increased, the permeability of the crosslinked membranes increased. In particular, the $CO_2$ permeability of the X-PI-3:2-20% membrane containing 20% by weight of the ladder-structured polysilsesquioxane was increased by 212% as compared with X-PI-3:2.

TABLE 5

|  | Gas permeability (Barrer) | | | | | Selectivity (—) | |
|---|---|---|---|---|---|---|---|
|  | $H_2$ | $CO_2$ | $N_2$ | $CO$ | $CH_4$ | $CO_2/N_2$ | $CO_2/CH_4$ |
| PI-3:2-20% | 17 | 9.9 | 0.31 | 0.60 | 0.29 | 31 | 31 |
| PI-2:1-20% | 20 | 7.6 | 0.22 | 0.50 | 0.21 | 34 | 37 |
| PI-4:1-20% | 22 | 12 | 0.46 | 0.80 | 0.48 | 26 | 25 |
| X-PI-3:2-20% | 69 | 50 | 1.8 | 3.3 | 1.8 | 28 | 28 |
| X-PI-2:1-20% | 83 | 58 | 2.2 | 3.7 | 2.1 | 26 | 28 |
| X-PI-4:1-20% | 150 | 110 | 4.0 | 7.1 | 7.0 | 28 | 28 |

Figures 3A, 3B:
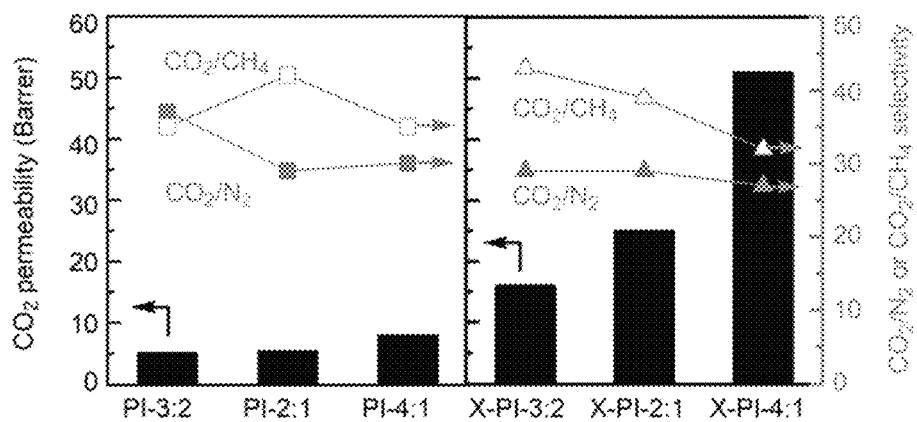
FIGS. 3(a)-3(d) show the gas permeability of a polyimide precursor membrane in FIG. 3(a) and a crosslinked polyimide membrane in FIG. 3(b) and the $CO_2$ permeability and $CO_2/N_2$ and $CO_2/CH_4$ selectivities of a hybrid polymer precursor membrane in FIG. 3(c) and a hybrid crosslinked polymer membrane in FIG. 3(d).
Figures 3C, 3D:
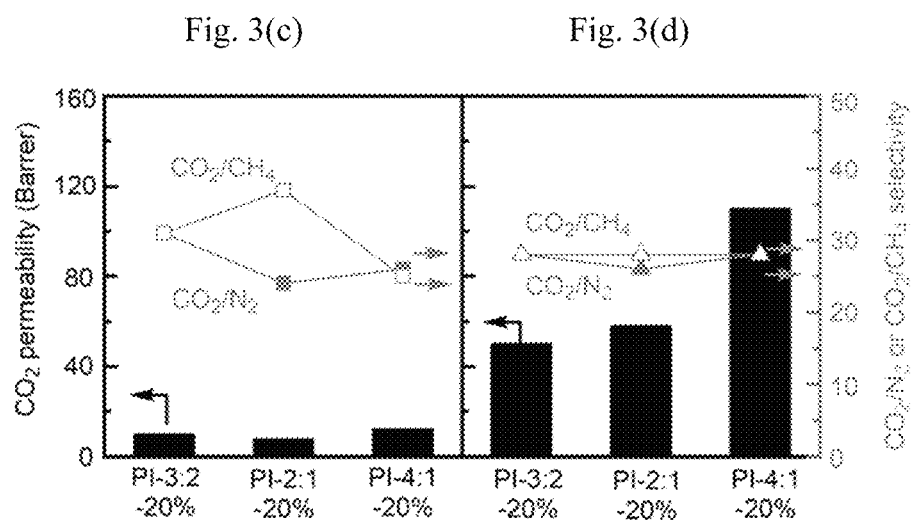

As can be seen from Table 5, the higher the ratio of Durene in the diamine, the higher the permeability (see FIGS. 3(a) and 3(c)). The hybrid crosslinked polymer membranes had a $CO_2$ permeability increased by 405 to 817% as compared with the hybrid polymer precursor membranes, showing a higher permeability as compared with the crosslinked polyimide membrane (see FIGS. 3(b) and 3(d)). For example, the X-PI-4:1-20% membrane had a $CO_2$ permeability higher than that of the X-PI-4:1 membrane by 115%.

In addition, the higher the ratio of Durene in the polyimide, the greater the effect of enhancing the permeability by crosslinking. For example, the $CO_2$ permeability of the X-PI-3:2-20% membrane increased by 405% as compared with the PI-3:2-20% membrane, whereas the $CO_2$ permeability of the X-PI-4:1-20% membrane increased by 817% as compared with the PI-4:1-20% membrane.

Figure 4A:
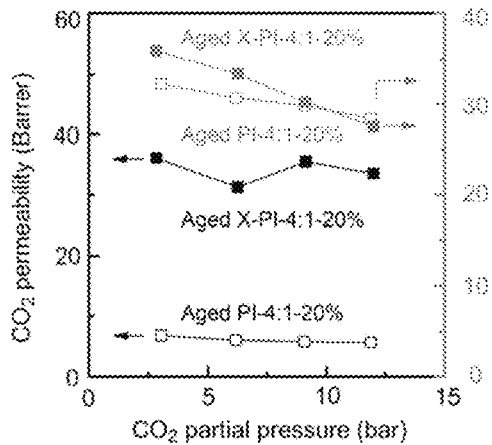
FIGS. 4(a)-4(b) show the separation performance of a $CO_2/CH_4$ mixed gas of the aged PI-4:1-20% membrane in FIG. 4(a) and the $CO_2$ permeability under high-pressure conditions in FIG. 4(b).
Figure 4B:
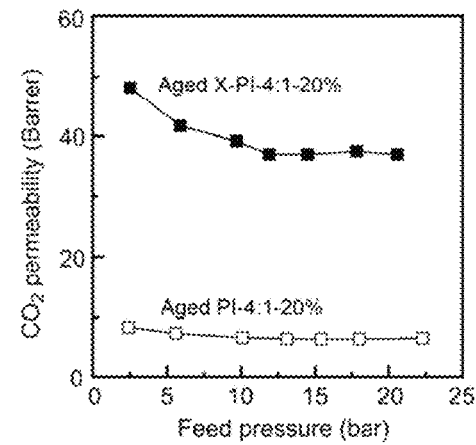

Meanwhile, the $CO_2/CH_4$ separation performance of the hybrid crosslinked polymer membrane was evaluated under a $CO_2/CH_4$ mixed gas condition (see FIG. 4(a)). As the pressure increased, the $CO_2$ permeability and $CO_2/CH_4$ selectivity tended to slightly decrease due to the competitive sorption phenomenon. It was confirmed that the plasticization phenomenon did not take place at a partial pressure of $CO_2$ of 12 bar. In addition, the $CO_2$ permeability of the X-PI-4:1-20% hybrid crosslinked polymer membrane was measured under a $CO_2$ single gas condition up to 22 bar, which indicates that plasticization did not take place despite an increase in the free volume (see FIG. 4(b)).

Test Example 3: Effect of Types of Polysilsesquioxane on the Gas Separation Performance of a Polymer Membrane The gas separation performance of the polymer precursor membranes obtained in Preparation Examples 3-2, 3-4, and 3-7 and the polymer membranes obtained by crosslinking thereof was measured under the conditions of 1 atm and 35° C. The results are shown in Table 6 below.

TABLE 6

|  | Gas permeability (Barrer) | | | | | Selectivity (—) | |
|---|---|---|---|---|---|---|---|
|  | $H_2$ | $CO_2$ | $N_2$ | $CO$ | $CH_4$ | $CO_2/N_2$ | $CO_2/CH_4$ |
| PI-2:1 | 18 | 5.5 | 0.19 | 0.33 | 0.13 | 29 | 42 |
| PI-2:1-OAPS20% | 11 | 4.1 | 0.12 | 0.34 | 0.11 | 34 | 37 |
| PI-2:1-20% | 20 | 7.6 | 0.22 | 0.50 | 0.21 | 34 | 37 |
| X-PI-2:1 | 52 | 25 | 0.87 | 1.5 | 0.64 | 29 | 39 |
| X-PI-2:1-OAPS20% | 72 | 37 | 1.3 | 2.4 | 1.1 | 28 | 33 |
| X-PI-2:1-20% | 83 | 58 | 2.2 | 3.7 | 2.1 | 26 | 28 |

Figure 5A:
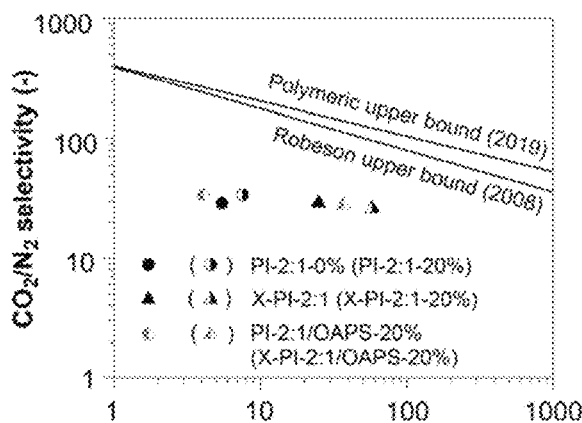
FIGS. 5(a)-5(d) show the separation performance (1 bar, 35° C.) of $CO_2/N_2$ and $CO_2/CH_4$ of the crosslinked membranes relative to the upper bound.
Figure 5B:
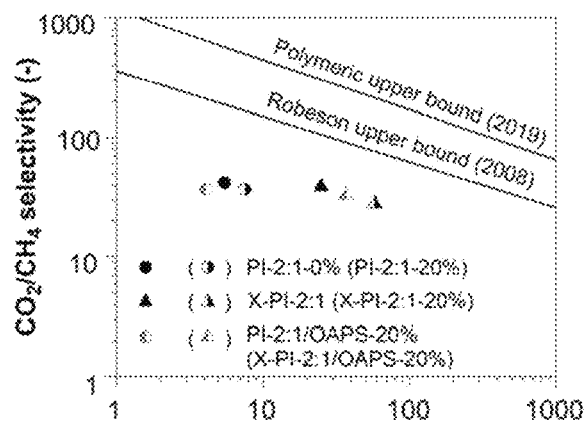

As can be seen from Table 6, the PI-2:1-OAPS20% membrane had a gas permeability lower than those of the PI-2:1 and PI-2:1-20% membranes. This is understood to be attributable to the inhibition of mobility of the polymer chain by OAPS. The X-PI-2:1-OAPS20% membrane obtained by thermal treatment of PI-2:1-GAPS-20% at 370° C. had an $H_2$ permeability and a $CO_2$ permeability reduced by 13% and 36%, respectively, as compared with X-PI-2:1-20% and $CO_2/N_2$ and $CO_2/CH_4$ selectivities increased by 8% and 18% (see FIGS. 5(a) and 5(b)), respectively. This indicates that the crosslinked membranes using the ladder-structured polysilsesquioxane have a superior gas permeability to the crosslinked membranes based on the cage-structured polysilsesquioxane.

Test Example 4: Gas Separation Performance of a Hybrid Crosslinked Polymer Membrane Based on a Fluorine-Containing Polyimide 6FDA-DAM:DABA(3:2) obtained in Preparation Example 4-1 and LPDA64 obtained in Preparation Example 2 were mixed at a weight ratio of 80:20 to form a polymer composition (hereinafter abbreviated as "X-6FDA-3:2-20%"). Then, a hybrid crosslinked polymer membrane was prepared in the same manners as in Preparation Examples 3 and 4 above.

Figure 5C:
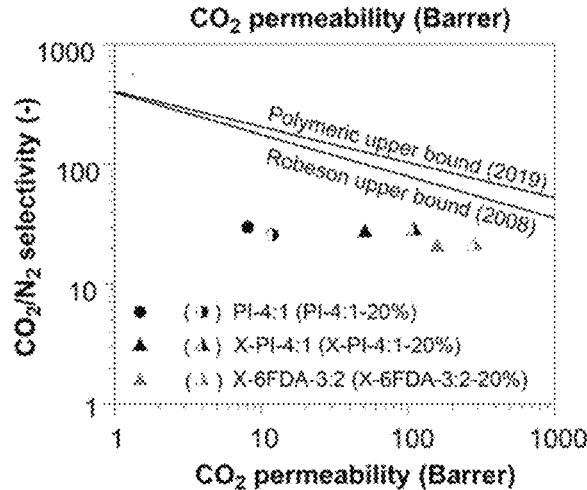
Figure 5D:
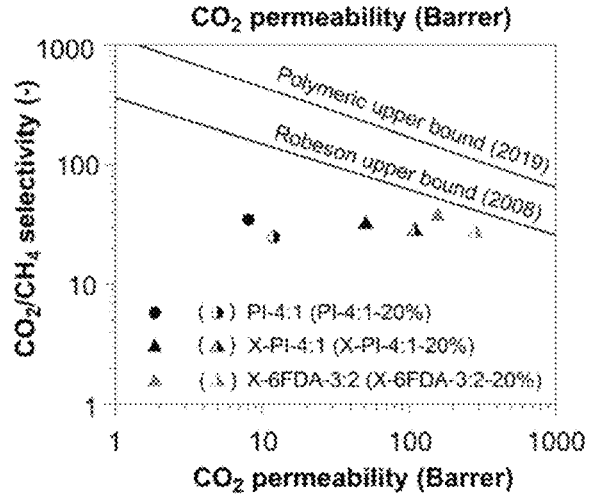

The X-6FDA-3:2-20% membrane had a $CO_2$ permeability increased by 83% (288 Barrer vs. 157 Barrer) as compared with the membrane prepared by simply crosslinking a polyimide polymer (see FIGS. 5(c) and 5(d)).

Accordingly, the hybrid crosslinked polymer membrane according to an embodiment of the present invention can be applied to a fluorine-containing polyimide.

Test Example 5: Mechanical Properties of a Polymer Precursor Membrane and a Crosslinked Polymer Membrane The mechanical properties of the polyimide membranes and the hybrid polymer precursor membranes before and after crosslinking were evaluated using nanoindentation (Table 7). PI-2:1 and PI-2:1/OAPS-20% were relatively decreased in the hardness and reduced modulus as compared with those before crosslinking due to an increase in the mobility of the polymer chain upon crosslinking Meanwhile, the X-PI-2:1-20% crosslinked membrane containing a ladder-structured polysilsesquioxane was increased in the hardness and reduced modulus by 47% and 128%, respectively.

TABLE 7

|  | Hardness (GPa) | Reduced modulus (GPa) |
| --- | --- | --- |
| PI-2:1 | 0.617 | 15.958 |
| PI-2:1-20% | 0.588 | 12.766 |
| PI-2:1/OAPS-20% | 0.523 | 9.742 |
| X-PI-2:1 | 0.504 | 10.587 |
| X-PI-2:1-20% | 0.862 | 29.126 |
| X-PI-2:1/OAPS-20% | 0.450 | 7.027 |

Accordingly, the hybrid crosslinked polymer membrane according to an embodiment of the present invention was excellent in mechanical properties.

What is claimed is:
1. A hybrid crosslinked polymer membrane, which is prepared from a polymer composition comprising 70 to 90% by weight of a glassy polymer having a first functional group and 10 to 30% by weight of a ladder-structured polysilsesquioxane having a second functional group capable of reacting with the first functional group and has a crosslinked structure formed by a reaction of the first functional group and the second functional group, wherein the glassy polymer is a polyimide obtained by polycondensation of an aromatic carboxylic dianhydride and an aromatic diamine, the first functional group is a carboxyl group, the second functional group is an amine group, and 70 to 100% of each of the first functional group and the second functional group participates in the crosslinking reaction.

2. The hybrid crosslinked polymer membrane of claim 1, wherein the aromatic carboxylic dianhydride is at least one selected from the group consisting of benzophenone-3,3',4,4'-tetracarboxylic dianhydride (BTDA) having a structure of Formula 1 (a) below, 4'4-oxydiphthalic dianhydride (ODPA) having a structure of Formula 1 (b) below, 3,3'4,4'-biphenyltetracarboxylic dianhydride (BPDA) having a structure of Formula 1 (c) below, and 4,4'-(hexafluoroisopropylidene) diphthalic dianhydride (6FDA) having a structure of Formula 1 (d) below:

Formula 1

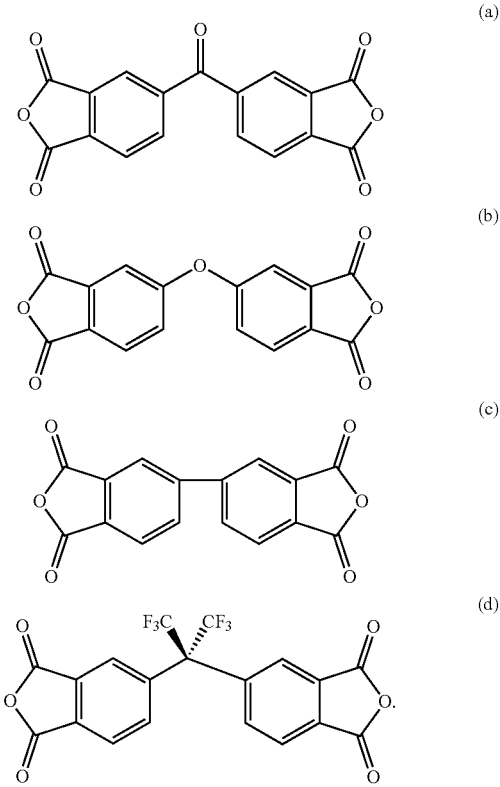

3. The hybrid crosslinked polymer membrane of claim 1, wherein the aromatic diamine is at least one selected from the group consisting of 2,3,5,6-tetramethylene-1,4-phenylenediamine (Durene) having a structure of Formula 2 (a) below, 3,5-diaminobenzoic acid (DABA) having a structure of Formula 2 (b) below, 1,1-bis(4-aminophenyl) cyclohexane (BACH) having a structure of Formula 2 (c) below, and 2,4,6-trimethyl-1,3-diaminobenzene (DAM) having a structure of Formula 2 (d) below:

Formula 2

(a)
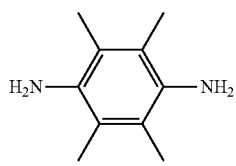

(b)
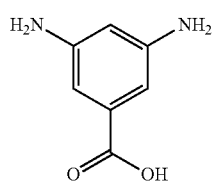

(c)
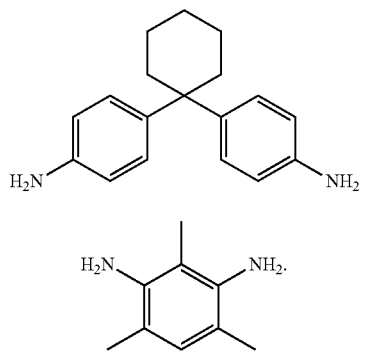

(d)
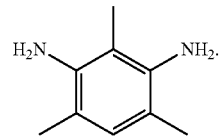

4. The hybrid crosslinked polymer membrane of claim 1, wherein the aromatic carboxylic dianhydride is benzophenone-3,3',4,4'-tetracarboxylic dianhydride (BTDA), and the aromatic diamine is a mixture of 2,3,5,6-tetramethylene-1,4-phenylenediamine (Durene) and 3,5-diaminobenzoic acid (DABA).

5. The hybrid crosslinked polymer membrane of claim 4, wherein the polyimide is a polyimide (BTDA-Durene:DABA (3:2)) having a structure of Formula 3 below:

Formula 3

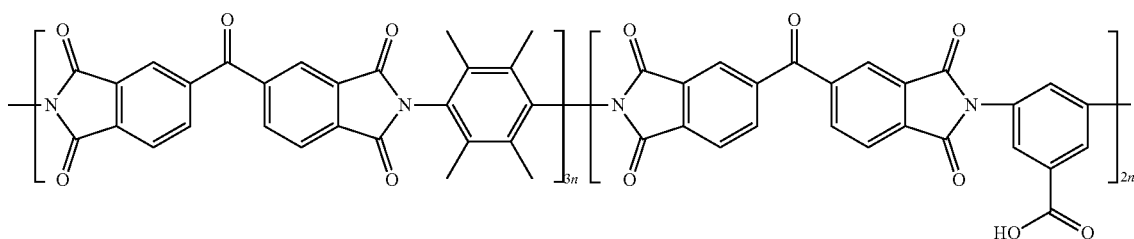

in Formula 3, n is an integer selected from $10^2$ to $10^4$.

6. The hybrid crosslinked polymer membrane of claim 1, wherein the ladder-structured polysilsesquioxane has a structure represented by Formula 4 below:

Formula 4

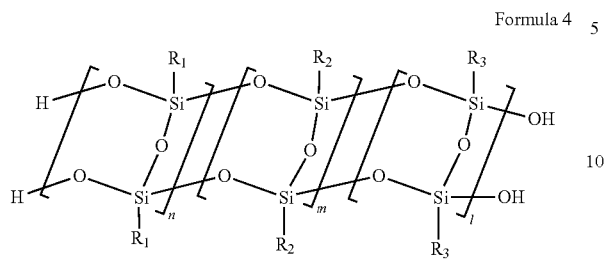

in Formula 4, $R_1$, $R_2$, and $R_3$ are each independently an organic functional group selected from the group consisting of aromatic phenyl, heteroaromatic phenyl, aliphatic alkyl, cycloaliphatic alkyl, vinyl, aryl, methacrylate, acrylate, and epoxy, and n, m, and l are each an integer selected from 0 to 100.

7. The hybrid crosslinked polymer membrane of claim 6, wherein the ladder-structured polysilsesquioxane has a number average molecular weight of $10^2$ to $10^8$ g/mole.

8. The hybrid crosslinked polymer membrane of claim 6, wherein the ladder-structured polysilsesquioxane is selected from the group consisting of ladder-structured poly(phenyl-co-3-(2-aminoethylamino)propyl)silsesquioxane, ladder-structured poly(phenyl-co-pyridylethyl) silsesquioxane, ladder-structured poly(cyclohexyl-co-pyridylethyl) silsesquioxane, ladder-structured poly(cyclohexyl-co-phenyl-co-pyridylethyl) silsesquioxane, and a mixture thereof.

9. The hybrid crosslinked polymer membrane of claim 6, wherein the ladder-structured polysilsesquioxane is at least one selected from the group consisting of ladder-structured poly(phenyl-co-3-(2-aminoethylamino) propyl) silsesquioxane (LPDA64) represented by the following Formula 4a; ladder-structured poly(phenyl-co-pyridylethyl) silsesquioxane (LPPyr64) represented by the following Formula 4d, ladder-structured poly(cyclohexyl-co-pyridylethyl) silsesquioxane (LCPyr64) represented by the following Formula 4e, and ladder-structured poly(cyclohexyl-co-phenyl-co-pyridylethyl) silsesquioxane (LCPPyr334) represented by the following Formula 4f:

Formula 4a

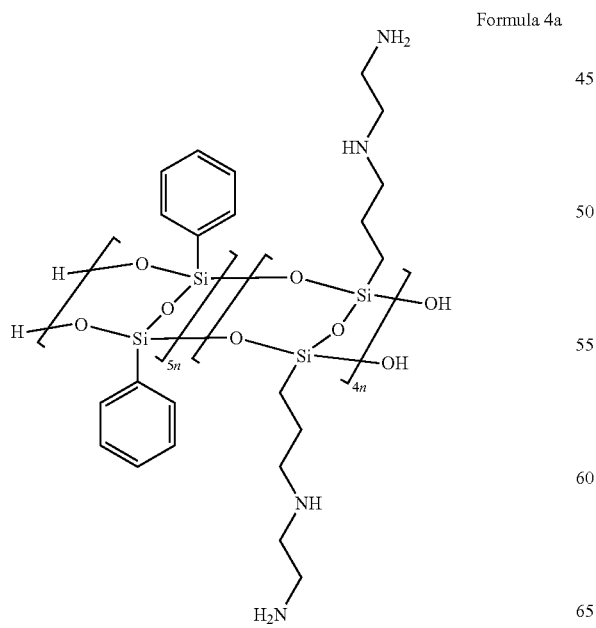

Formula 4d

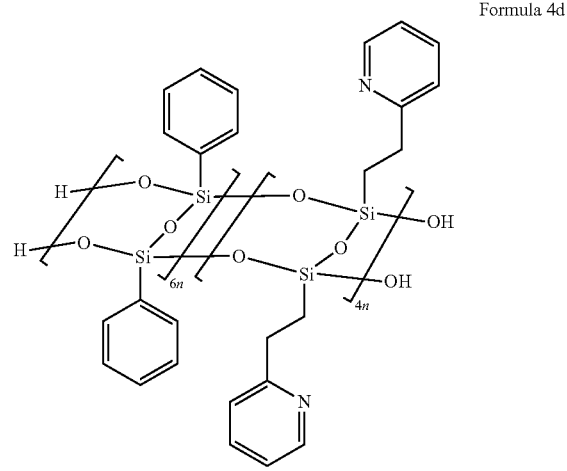

Formula 4e

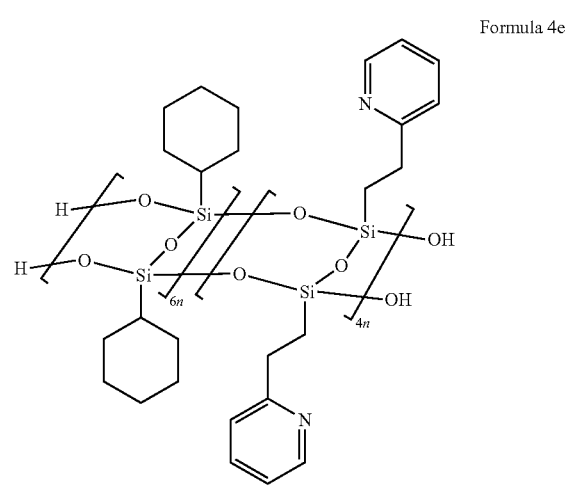

Formula 4f

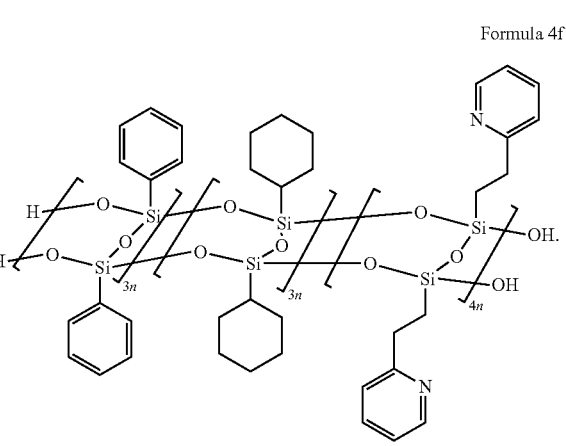

10. The hybrid crosslinked polymer membrane of claim 1, which has a thickness of 5 to 100 μm.